(12) United States Patent
Yang et al.

(10) Patent No.: US 8,464,995 B2
(45) Date of Patent: Jun. 18, 2013

(54) MULTI-ORIENTATION SUPPORT

(75) Inventors: He-Hui Yang, Shenzhen (CN);
Shuang-Hong Xiao, Shenzhen (CN);
Kai-Kuei Wu, New Taipei (TW);
Kun-Chih Hsieh, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 77 days.

(21) Appl. No.: 13/195,014

(22) Filed: Aug. 1, 2011

(65) Prior Publication Data
US 2012/0325999 A1    Dec. 27, 2012

(30) Foreign Application Priority Data
Jun. 22, 2011    (CN) ...................... 2011 2 0212895 U

(51) Int. Cl.
*A47G 1/24*    (2006.01)
(52) U.S. Cl.
USPC .......................................... 248/455; 248/454
(58) Field of Classification Search
USPC .............. 248/441.1, 444, 447, 448, 449, 454, 248/455, 457, 458, 460, 462, 463; 108/5–7, 108/9, 44, 43; 40/606.01, 606.14, 745
See application file for complete search history.

(56) References Cited

U.S. PATENT DOCUMENTS

| | | | | |
|---|---|---|---|---|
| 4,116,413 A * | 9/1978 | Andersen | ...................... | 248/451 |
| 4,421,943 A * | 12/1983 | Withjack | ...................... | 136/246 |
| 6,045,108 A * | 4/2000 | Cziraky | ...................... | 248/454 |
| 6,111,491 A * | 8/2000 | Furuse et al. | ................. | 335/285 |
| 6,971,622 B2 * | 12/2005 | Ziegler et al. | ................. | 248/454 |
| 7,762,515 B2 * | 7/2010 | Lin | .............................. | 248/447 |
| 8,162,283 B1 * | 4/2012 | Royz et al. | ..................... | 248/455 |
| 2007/0221811 A1 * | 9/2007 | Hauser et al. | ................. | 248/454 |
| 2008/0290241 A1 * | 11/2008 | Chou | ............................ | 248/454 |
| 2010/0090085 A1 * | 4/2010 | Corrion | ........................ | 248/459 |
| 2010/0301187 A1 * | 12/2010 | Peet | .............................. | 248/447 |
| 2011/0180682 A1 * | 7/2011 | Tarnutzer et al. | ............. | 248/447 |

* cited by examiner

*Primary Examiner* — Alfred J Wujciak
(74) *Attorney, Agent, or Firm* — Altis Law Group, Inc.

(57) ABSTRACT

A device support includes a base, a first supporting frame, and a second supporting frame. One end of the first supporting frame is rotatably connected to the base, and an opposite end of the first supporting frame is rotatably connected to one end of the second supporting frame. A sliding plate is rotatably connected to an opposite end of the second supporting frame, and the sliding plate is slidable on the base, and the sliding plate and the base are magnetically attached to each other.

18 Claims, 5 Drawing Sheets

MULTI-ORIENTATION SUPPORT

BACKGROUND

1. Technical Field

The present disclosure relates to the supporting of an electronic device, especially to a multi-orientation support of an electronic device.

2. Description of Related Art

Portable electronic devices such as electronic readers usually include a support to support the electronic reader on a table. The support can only support the device in one or two positions. It is appreciated and useful if a support can provide a greater range of orientation for the portable electronic devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
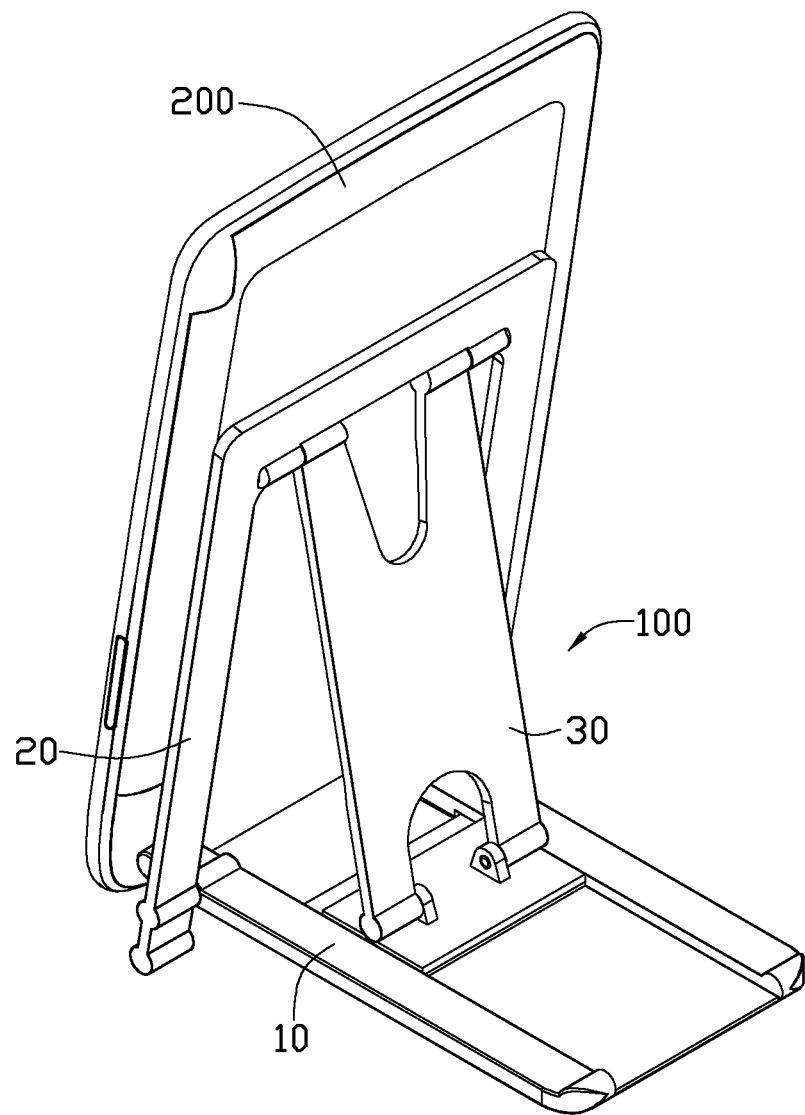
FIG. 1 is an isometric view showing a support for an electronic device according to an exemplary embodiment.
Figure 2:
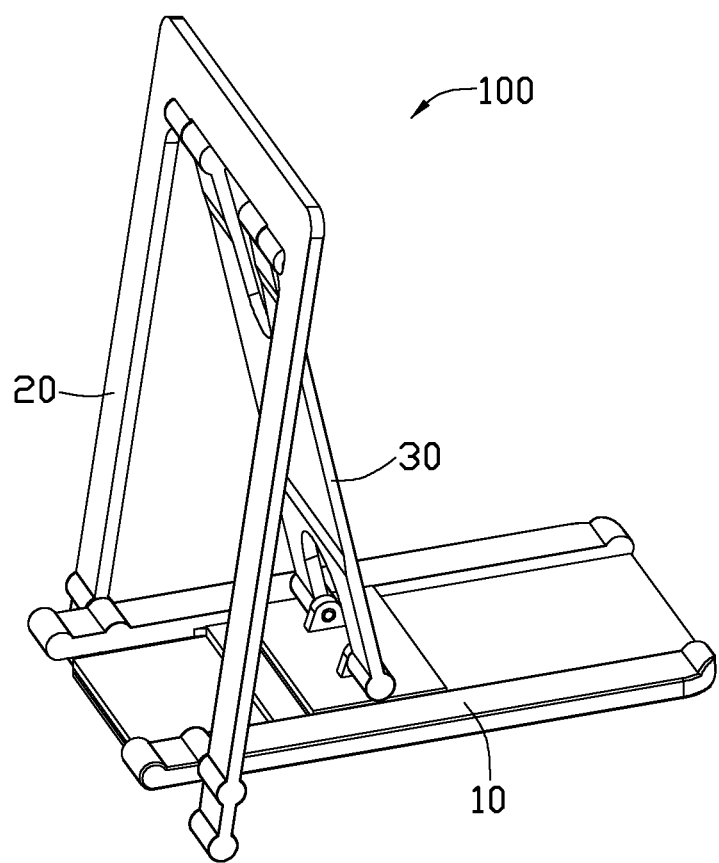
FIG. 2 is similar to FIG. 1, but showing the support in a first orientation, with the electronic device omitted.
Figure 3:
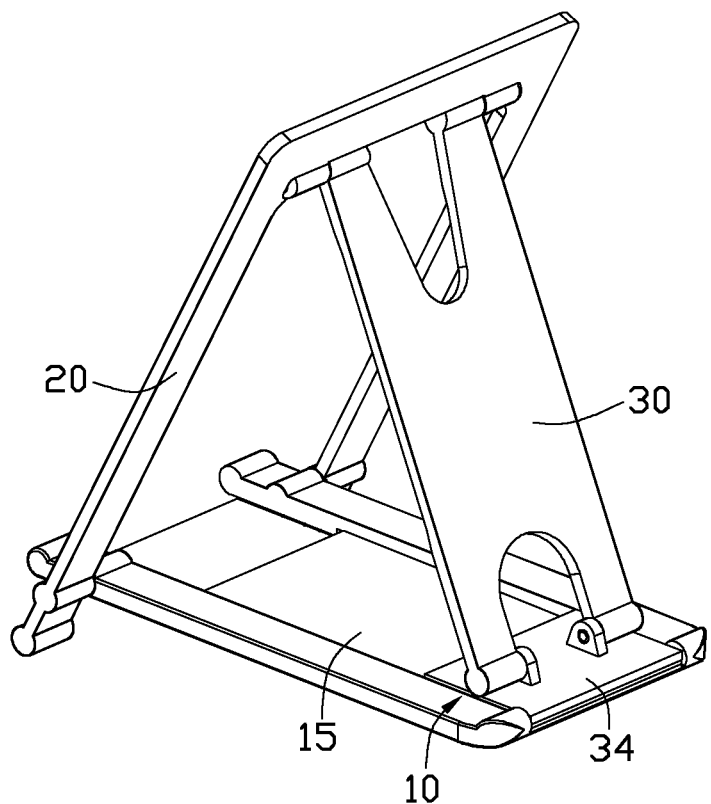
FIG. 3 is similar to FIG. 2, but showing the support in a second orientation.

Referring to FIGS. 1-3, a support 100 for an electronic device 200 according to an exemplary embodiment is provided. The support 100 includes a base 10, a first supporting frame 20, and a second supporting frame 30. One end of the first supporting frame 20 is rotatably connected to the base 10, and the opposite end of the first supporting frame 20 is rotatably connected to one end of the second supporting frame 30. The opposite end of the second supporting frame 30 rests on the base 10 and can slide on the base 10. As the second supporting frame 30 moves, the first supporting frame 20 rotates with respect to the base 10. The orientation of the electronic device 200 that leans against the first supporting frame 20 can thus be adjusted.

Figure 4:
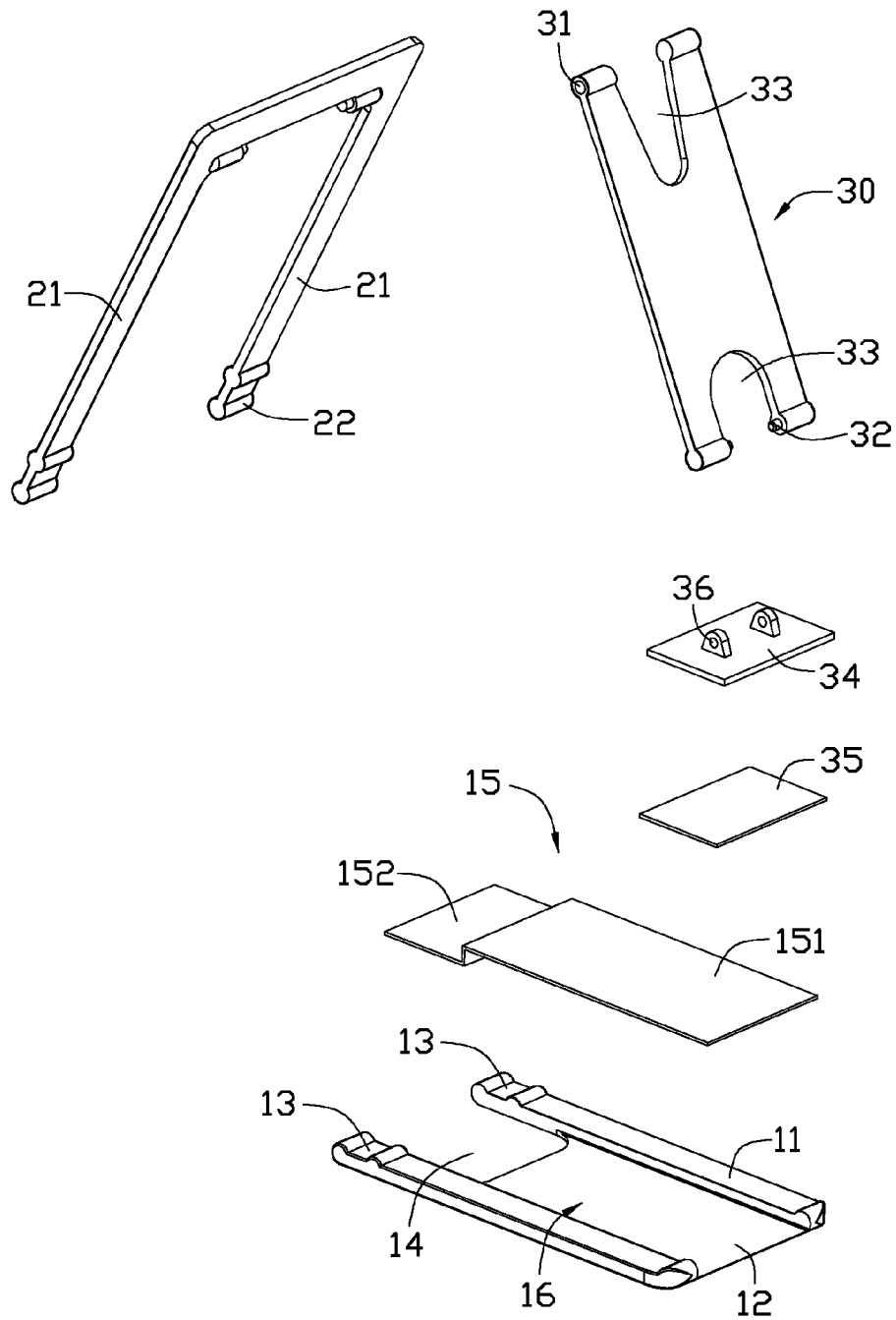
FIG. 4 is an isometric, exploded view of the support of FIG. 3.

Referring to FIG. 4, the base 10 includes two sidewalls 11 and a bottom plate 16 connecting the sidewalls 11. A sliding channel 12 is formed between the sidewalls 11. One end of the bottom plate 16 adjacent to the first supporting frame 20 defines an opening 14. In the embodiment, the two sidewalls 11 are integrally formed with the bottom plate 16. One end of each sidewall 11 includes two projections 13. The electronic device 200 is held in place on the base 10 by the two projections 13. A first soft magnetic plate 15 is arranged in the sliding channel 12. In the embodiment, the first soft magnetic plate 15 includes a first portion 151 and a second portion 152. The first portion 151 and the second portion 152 are substantially parallel and are connected by a vertical wall. The second portion 152 is received in the opening 14. The free end of the second supporting frame 30 can slide on the first portion 151. The width of the first soft magnetic plate 15 is approximately equal to that of the sliding channel 12, and the first soft magnetic plate 15 adheres to the sliding channel 12.

The first supporting frame 20 is approximately U-shaped and includes two arms 21 and two pivot protrusions 22 extending from the arms 21 and facing toward each other The forward ends of the sidewalls 11 of the base 10 are rotatably connected to two pivot protrusions 22.

Two U-shaped cutouts 33 are defined in the opposite ends of the second supporting frame 30. One end of the second supporting frame 30 includes two first receiving holes 31 for rotatably receiving the two pivot protrusions 22 of the first supporting frame 20, thereby rotatably connecting the second supporting frame 30 to the first supporting frame 20. The opposite end of the second supporting frame 30 includes two bosses 32 protruding inwards from the sidewalls of the cutout 33. The support 100 further includes a sliding plate 34 including two ears 36. The bosses 32 are rotatably connected to the ears 36, thereby rotatably connecting the sliding plate 34 to the second supporting frame 30.

In the embodiment, a second soft magnetic plate 35 is fixed to the bottom of the sliding plate 34. The plate 35 is magnetically attracted to the magnetic plate 15. The sliding plate 34 can then be held in position by the attraction between the soft magnetic plates 15 and 35.

The base 10, the supporting arms 20, 30, and the sliding plate 34 constitute a slider-crank mechanism. The movement of the sliding plate 34 causes movement of the first supporting frame 20. Thus, to adjust the orientation of first supporting frame 20 a pushing force sufficient to overcome the attraction between the soft magnetic plates 15 and 35 is applied to the second supporting frame 30, the sliding plate 34 then moves on the first soft magnetic plate 15 and allows movement in the first supporting frame 20. When the required orientation has been achieved, the sliding plate 34 is held in that particular position by magnetism, thereby maintaining the desired orientation.

Figure 5:
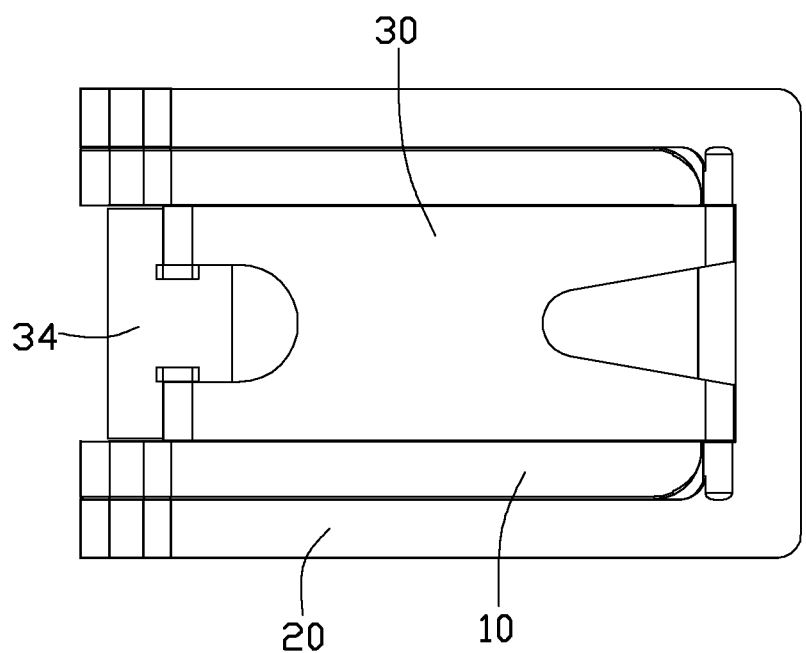
FIG. 5 is an isometric view showing the support of FIG. 1 in a collapsed state.

Referring to FIG. 5, when not in use, the support 100 can be collapsed. Specifically, the sliding plate 34 is firstly moved to rest on the second portion 152 of the first soft magnetic plate 15, in the opening 14 of the base 10. The second supporting frame 30 is then completely received in the opening 21 of the first supporting frame 20. The second supporting frame 30 and the first supporting frame 20 as a whole can then be rotated forward and closed bookwise with the base 10. The first supporting frame 20, the second supporting frame 30, and the base 10 collapse together into a substantially planar structure, thereby saving storage space.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and the arrangement of parts within the principles of the present disclosure to the full extent indicated by the broad general meaning of the terms in which the appended claims are expressed.

What is claimed is:

1. A support for providing a multi-orientation support of an electronic device
   a base;
   a first supporting frame; and
   a second supporting frame, wherein the base comprises two sidewalls and a bottom plate connecting the two sidewalls, a sliding channel is formed between the two sidewalls, and a first soft magnetic plate is arranged in the sliding channel, a first end of the first supporting frame is rotatably connected to the base, and an opposite second end of the first supporting frame is rotatably connected to a first end of the second supporting frame; and a sliding plate is rotatably connected to an opposite second end of the second supporting frame, and a second soft magnetic plate is fixed to the bottom of the sliding plate, and magnetically attached on the first soft magnetic plate, and the sliding plate and the base are magnetically attached to each other, and the sliding plate is slidably on the sliding channel of base, wherein the siding of the first soft magnetic plate on the second magnetic plate provides plurality orientations of the support.

2. The support of claim 1, wherein the second end of the second supporting frame comprises two bosses, the sliding plate comprises two ears, the bosses are rotatably coupled to the ears.

3. The support of claim 2, wherein the second end of the second supporting frame is slidable along the sliding channel to adjust orientation of the first supporting frame.

4. The support of claim 3, wherein the two sidewalls are integrally formed with the bottom plate.

5. The support of claim 3, wherein a distal end of each of the sidewalls of the base comprises two projections for holding the electronic device in position when the electronic device is supported on the support.

6. The support of claim 3, wherein one end of the bottom plate adjacent to the first end of the first supporting frame defines an opening to receive the second end of the second supporting frame.

7. The support of claim 6, wherein the first soft magnetic plate comprises a first portion and a second raised portion parallel to the first portion, the second portion is received in the opening, the second end of the second supporting frame is slidable on the first portion.

8. The support of claim 7, wherein the width of the first soft magnetic plate is equal to that of the sliding channel, and the first soft magnetic plate is adhered on the bottom plate of in the sliding channel.

9. The support of claim 3, wherein the first soft magnetic plate comprises a first portion and a second raised portion parallel to the first portion, the second portion is received in the opening, the second end of the second supporting frame is slidable on the first portion.

10. The support of claim 2, wherein the first supporting frame includes two arms and two pivot protrusions extending from the arms and facing toward each other; the second supporting frame includes two first receiving holes for rotatably receiving the two pivot protrusions of the first supporting frame.

11. The support of claim 10, wherein the sidewalls of the base are rotatably connected between the arms of the first end of the first supporting frame.

12. The support of claim 1, wherein one end of the bottom plate adjacent to the first end of the first supporting frame defines an opening to receive the second end of the second supporting frame.

13. The support of claim 12, wherein the first soft magnetic plate comprises a first portion and a second raised portion parallel to the first portion, the second portion is received in the opening, the second end of the second supporting frame is slidable on the first portion.

14. The support of claim 13, wherein the width of the first soft magnetic plate is equal to that of the sliding channel, and the first soft magnetic plate is adhered on the bottom plate.

15. The support of claim 13, wherein the second end of the second supporting frame comprises two bosses, the sliding plate comprises two ears, the bosses are rotatably coupled to the ears.

16. The support of claim 13, wherein a distal end of each of the sidewalls of the base comprises two projections for holding an electronic device in position when the electronic device is supported on the support.

17. The support of claim 13, wherein the second end of the second supporting frame is slidable along the sliding channel to adjust orientation of the first supporting frame.

18. The support of claim 13, wherein the two sidewalls are integrally formed with the bottom plate.

* * * * *